(12) United States Patent
Akenine-Moller et al.

(10) Patent No.: US 9,626,793 B2
(45) Date of Patent: Apr. 18, 2017

(54) VARIABLE DEPTH COMPRESSION

(75) Inventors: Tomas G. Akenine-Moller, Lund (SE); Jim K. Nilsson, Lund (SE); Magnus Andersson, Helsingborg (SE); Jon N. Hasselgren, Bulkelflostrand (SE)

(73) Assignee: Intel Corporation, Santa Clara, CA (US)

( * ) Notice: Subject to any disclaimer, the term of this patent is extended or adjusted under 35 U.S.C. 154(b) by 451 days.

(21) Appl. No.: 13/993,466

(22) PCT Filed: Dec. 29, 2011

(86) PCT No.: PCT/US2011/067902
§ 371 (c)(1),
(2), (4) Date: Jun. 12, 2013

(87) PCT Pub. No.: WO2013/101095
PCT Pub. Date: Jul. 4, 2013

(65) Prior Publication Data
US 2014/0009467 A1    Jan. 9, 2014

(51) Int. Cl.
*G06T 15/40* (2011.01)
*G06T 9/00* (2006.01)
*H04N 19/597* (2014.01)

(52) U.S. Cl.
CPC ............ *G06T 15/405* (2013.01); *G06T 9/00* (2013.01); *H04N 19/597* (2014.11); *G09G 2320/0261* (2013.01); *G09G 2320/10* (2013.01); *G09G 2340/02* (2013.01)

(58) Field of Classification Search
CPC ... G06T 15/405; H04N 19/176; H04N 19/156
See application file for complete search history.

(56) References Cited

U.S. PATENT DOCUMENTS

| 6,215,898 | B1 * | 4/2001 | Woodfill | G06K 9/32 |
| | | | | 348/47 |
| 2007/0092006 | A1 * | 4/2007 | Malayath | H04N 19/156 |
| | | | | 375/240.16 |
| 2010/0166073 | A1 * | 7/2010 | Schmit | H04N 19/176 |
| | | | | 375/240.16 |
| 2010/0202535 | A1 | 8/2010 | Fang | |
| 2011/0206288 | A1 | 8/2011 | Lee | |

FOREIGN PATENT DOCUMENTS

| EP | 1591963 | 7/2008 |
| JP | H09037246 A | 2/1997 |
| JP | 2002152776 A | 5/2002 |
| JP | 2009151758 A | 7/2009 |
| JP | 2010218548 A | 9/2010 |

(Continued)

OTHER PUBLICATIONS

PCT International Search Report and Written Opinion issued in corresponding PCT/US2011/067902 dated Sep. 21, 2012 (8 pages).

(Continued)

*Primary Examiner* — Phi Hoang
(74) *Attorney, Agent, or Firm* — Trop Pruner & Hu, P.C.

(57) ABSTRACT

In accordance with some embodiments, the number of bits allocated to depth compression may be changed variably based on a number of considerations. As a result, depth data may be compressed in a more efficient way.

24 Claims, 3 Drawing Sheets

(56) References Cited

FOREIGN PATENT DOCUMENTS

| | | |
|---|---|---|
| JP | 2011205529 A | 10/2011 |
| KR | 10-2000-0049031 | 7/2000 |
| KR | 10-2009-0003348 | 1/2009 |
| KR | 2010-0083980 | 7/2010 |
| KR | 101057376 B1 | 8/2011 |
| KR | 10-2011-0124447 | 11/2011 |

OTHER PUBLICATIONS

Japanese Patent Office, Japanese office action issued in corresponding JP application No. 2014-545881 dated Jul. 14, 2015 (9 pages) [w/English translation].
KR Office action issued by KIPO dated May 9, 2016 in corresponding KR divisional application No. 2016-7006561 (13 pages).
Chinese 2nd office action issued in corresponding CN patent application No. 201180076154.3 dated Dec. 22, 2016 (4 pages).
Korean office action issued on May 30, 2016 in corresponding KR divisional application No. 2016-7006561 (13 pages).
Korean final rejection issued on Sep. 19, 2016 in corresponding KR divisional application No. 2016-7006561 (7 pages).
Korean notice of allowance issued on Nov. 10, 2016 in corresponding KR divisional application No. 2016-7006561 (3 pages).

* cited by examiner

VARIABLE DEPTH COMPRESSION

BACKGROUND

This relates generally to graphics processing and, particularly, to compression of depth buffers for stochastic motion blur rasterization.

Motion blur rasterization attempts to more accurately represent moving objects and, particularly, to represent the blur that is observed when objects move fast enough. Ignoring motion blur, information about the depths of primitives within the scene may be readily compressed. Particularly, the depth of each primitive may be determined as a distance from the imaging device to the primitive. Algorithms exist for reducing this depth information when motion blur is not involved.

However, when motion blur is involved, it is a much more complex operation to attempt to compress depth information.

Graphics processors tend to be extremely sensitive to increased power consumption with increased memory bandwidth usage. Memory bandwidth is also in itself a scarce resource on modern graphics processors. Currently, there is more emphasis on obtaining stochastic rasterization of motion blur and depth of field and to obtain this information on an interactive or even real time rendering basis. This involves significant memory bandwidth usage, implicating increased power consumption.

BRIEF DESCRIPTION OF THE DRAWINGS

Some embodiments are described with respect to the following figures.

DETAILED DESCRIPTION

Figure 1:
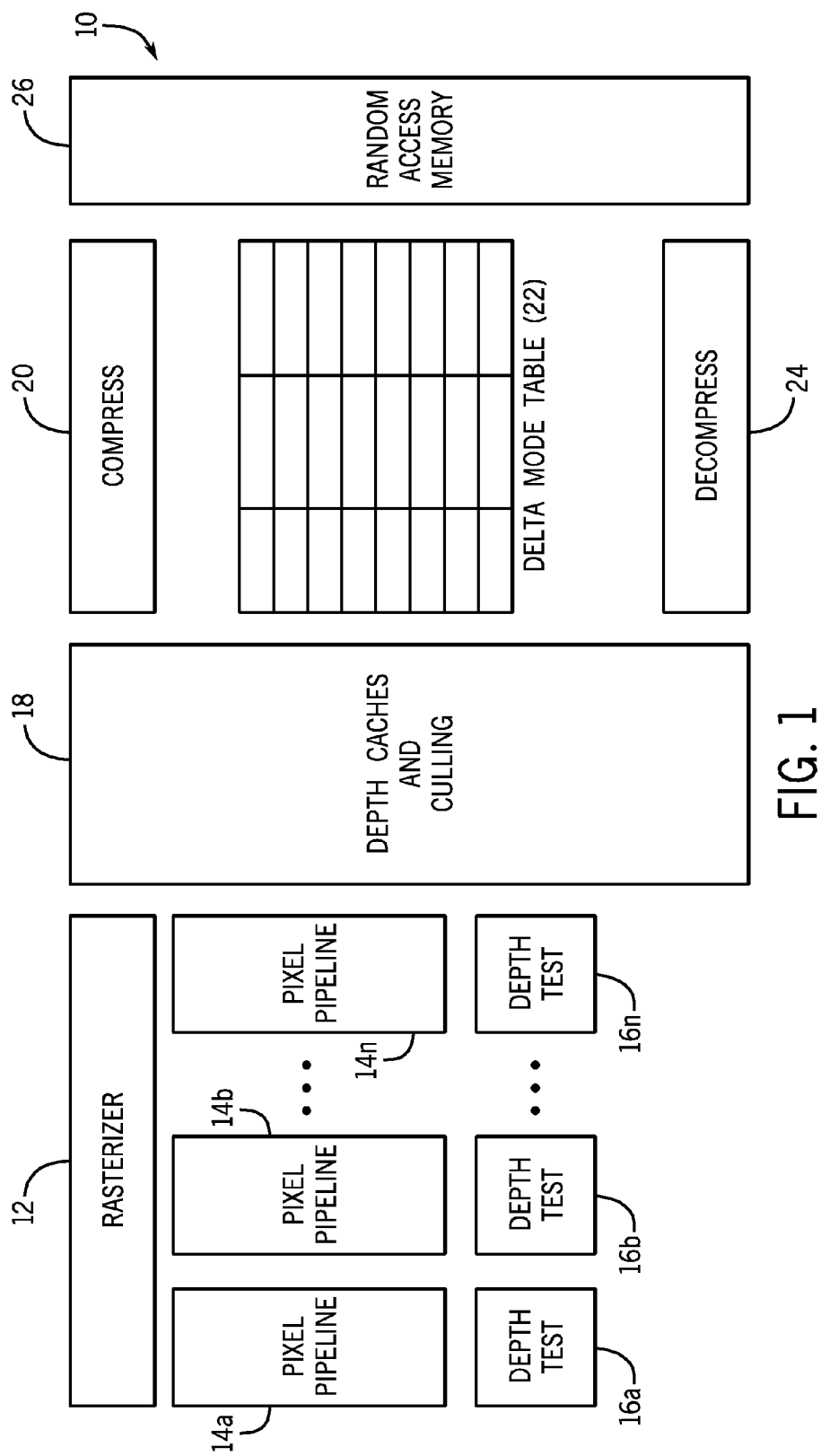
FIG. 1 is a schematic depiction of one embodiment of the present invention.

In accordance with some embodiments, the number of bits allocated to depth compression may be changed variably based on a number of considerations. As a result, depth data may be compressed in a more efficient way.

Depth buffer compression is one technique to reduce memory bandwidth usage. Typically, the depth z of any primitive within a tile is linear over the primitive, which typically is a triangle. This may be exploited to construct inexpensive compression and decompression algorithms.

Plane encoding attempts to take advantage of this linear relationship. The rasterizer feeds exact plane equations to a compressor and, therefore, no residual terms are needed. However, when motion blur is involved, each vertex may move according to a linear function. Then the depth function at a sample is a rational cubic function. This function makes it substantially harder to predict depth over an entire tile using a simple predictor function. As a consequence, the standard depth buffer compression techniques, especially those exploiting exact plane equations, may fail to compress such noisy buffers.

A block of pixels, called a tile, may be processed independently. Current depth compression schemes do not handle motion blur and depth of field explicitly and, therefore, they do not have the time component or lens parameters.

Generally, depth compression algorithms use three common steps which may be called clustering, predictor function generation, and residual encoding. Clustering is used when sets of samples in a tile belong to different layers, for example a background layer and a foreground layer. In this case, it is hard to compress all depths in the tile using the same predictor function.

The clustering step attempts to separate the samples of the tile into two or more layers, where the samples in each layer typically share some characteristic, such as lying in a common plane. A goal of splitting the samples into two or more layers is that each layer may ideally become simpler to compress compared to compressing all the samples in a single layer.

In predictor function generation, each layer generates its own predictor function. A goal is to use the depth samples and possibly their fixed coordinates to create a predictor function to predict the depth of each sample using an inexpensive function. For example, assume that a rectangle with small per pixel displacements has been rendered to a tile. As a predictor function, one may use the plane of the rectangle, since it is probably a good guess on where the displaced depths will lie. Even if the guess is not perfect, imperfections can be handled in the next step.

Residual encoding enables more exact depths to be reconstructed during decompression of the tile, since a common requirement of graphics processors is that the depth buffer be non-lossy. The residual is the difference between the predictor function and the actual sample depths. Given a good predictor function, the residuals between the depth of the samples and the predictor function may be small. As a consequence, those residuals can be encoded using relatively few bits. Then good compression ratios can be achieved (if there are a small number of layers) and storage needed for the predictor function is small.

In some embodiments, the depth buffer compression may use anchor encoding, but other techniques may be used as well, including plane encoding. The construction of plane equations and plane encoding, based on plane data derivatives or delta vectors, fails to handle extreme planes in the sense that the true derivatives are very large compared to the allocated bit budget for storing these derivatives. Consequently, the actual plane representation accuracy may be reduced. This accuracy reduction increases with distance within the tile from the point where the delta vectors are evaluated. On the other hand, naively allocating too many bits for delta vectors reduces the number of bits available for storing depth value residuals.

Thus, in some embodiments, the impact of statically assigning available bits to delta vectors may be reduced by allowing dynamic allocation of bits depending on the nature of the depth data.

Depending on the rasterized geometry, a tile can be the target of a multitude of primitives, resulting in a complex distribution of depth values over the time. Using one or more plane equations as a base prediction of these depth values, the residual values are encoded in the compressed depth data format. As a consequence of the nature of the predictor planes, predicted depth values may be more or less correct, resulting in varying need for residual correction bits.

Current depth compression mechanisms statically allocate an equal number of residual bits for all tile positions, which may potentially be a poor match for actual depth values. In some embodiments, the impact of statically assigning available bits to residual correction bits is reduced by, instead, allowing for dynamically allocating the number of residual bits for individual tile positions.

In an anchor encoding embodiment, a depth data compression mechanism detects plane representations of rasterized primitives by picking one or more points in the tile as candidate anchor points. The evaluation of an anchor point includes the calculation of local and planar X and Y derivatives based on depth data values. A predictor plane representation (zp(x,y)=a+b*x+c*y) is encoded in the compressed depth data as three values: a, b, and c, where a is the depth value at the anchor point, b is dZ/dX, and c is dZ/dY. The values b and c are the delta values or "vectors".

For each depth, z(x,y), in the tile, residual depth values are stored as the difference between the predicted and the true depth values. The value d is a residual value.

By selecting the number of bits allocated for delta and residual values, the total bit budget for the tile depth data can be reduced without loss of the depth value precision. A net compression of depth data may be achieved in some embodiments.

We introduce the notion of delta modes, which designate a particular combination of X, Y, and R, where X is the number of bits for the delta-X vectors, Y is the number of bits for the delta-Y vectors, an R is the number of residual bits per depth. At compression, these modes are available for selection for each anchor point in the tile.

In one variation, each anchor point may potentially have its own set of available modes, where the modes are dynamically created during and guided by the results of compression.

In another variation, to simplify encoding, the same number of bits can be used for both directions (X and Y). Below, we consider a mode table to be statically created and stored before compression begins. See Table 1 for an example set of delta modes where B=512, N=4, M=3, A=32, T=32.

TABLE 1

Example delta mode table.

| Mode | X | Y | R |
|------|----|----|----|
| 1 | 3 | 3 | 14 |
| 2 | 6 | 6 | 13 |
| 3 | 9 | 9 | 11 |
| 4 | 8 | 10 | 11 |
| 5 | 10 | 8 | 11 |
| 6 | 13 | 13 | 10 |
| 7 | 11 | 17 | 9 |
| 8 | 17 | 11 | 9 |

Given the tile dimensions and bit budget for compression, there is a tradeoff between the number of bits available for delta values and residual values. Not all combinations of X, Y, and R, are relevant. It is only meaningful to reduce X and/or Y if R can be increased by at least one bit. This restricts the number of available modes.

The following condition has to be met to enable compression of a tile:

$$T*\log_2(N)+N*(M+A+X+Y)+(T-N*3)*R<B$$

where
B=total bit budget to enable compression
N=number of anchor points
M=log2(number of modes) bits to represent the used mode for an anchor point
A=number of bits used for anchor point depth value
X=number of bits used for X delta
Y=number of bits used for Y delta
T=total number of depths in tile
R=number of bits used for residual depth values.

The T*log2(N)-term reserves log2(N) bits per depth in a tile in order to indicate which plane equation a depth is using. The (T−N*3) term implies that the anchor point depth, as well as the first-order derivatives (dZ/dX, and dZ/dY) are exact, i.e., they do not require storage of residual bits. In another embodiment, neither the anchor point, nor the first order derivatives, are exact, which would require residual bits for those depths as well, making the last term of the above inequality be T instead of (T−N*3). If the anchor point is exact but not the derivatives, the term instead becomes (T−N). In the example above, the anchor value as well as derivatives land exactly on the correct depth value, which often is a reasonable assumption.

The algorithm for selecting the mode for each anchor point is as follows, according to one embodiment:

A table with 2M rows is constructed that stores a number of allocated delta bits for each direction (X and Y). See Table 1 for example. Then, N anchor point positions are given, where N=1, 2, 3, . . . , T (usually between 1 and 4). Next, for each anchor point, the minimum required number of bits to represent the delta vectors is calculated. This may be done by simply computing the delta vectors from the anchor point's depth to the right (or left) neighbor for dZ/dX, and to the upper (or lower) neighbor for dZ/dY, and examining how many bits are needed (by finding the first and most significant set bit). The corresponding mode with the maximum number of residual bits is selected as the mode for this anchor point.

An advantage of this simple scheme is that it allows more tiles to be compressed, which, in the end, reduces the memory bandwidth usage for depth (which is a significant consumer of bandwidth in a graphics processor). For example, a tile with large delta vectors which at the same time only needs a few residual bits per depth can be compressed. Similarly, a tile with small delta vectors which require many residual bits can be compressed as well.

Due to insufficient accuracy and/or precision, in turn due to extreme plane representations or simply complex tile data, plane predictors need residual bits per tile position to adjust to correct depth values. Depending on the amount of inaccuracy in the prediction, a varying number of residual bits are actually needed to encode the difference between the prediction and the correct value.

We propose the use of a residual mode mask with one entry per tile location to store an indicator of how many residual bits are needed for that location. The aim is to use as few bits as possible for each location, resulting in a total minimum of required bits.

The possible number of residual bits used for each location can be statically assigned with appropriate values, or dynamically calculated based on tile data.

For dynamically assigned residual modes, the algorithm works as follows, in one embodiment:

During compression of a tile, the predictor depth is compared with the actual depth and calculate residual value. Then the shortest mode (i.e., the mode that captures required difference, with the least number of bits) is selected to encode the residuals. Next, the corresponding mode value is filled in the residual mode mask. Finally, the residual mode mask is stored in the encoded tile data.

The technique may be illustrated with an example.

TABLE 2

| Mode | Residual bits |
| --- | --- |
| 00 = 0 | 2 |
| 01 = 1 | 8 |
| 10 = 2 | 12 |
| 11 = 3 | 16 |

Example Residual Mode Table with Four Modes

TABLE 3

|  | X0 | X1 | X2 | X3 |
| --- | --- | --- | --- | --- |
| Y0 | 00 | 00 | 01 | 10 |
| Y1 | 00 | 01 | 11 | 00 |
| Y2 | 00 | 10 | 01 | 00 |
| Y3 | 01 | 00 | 00 | 00 |

Example Tile of 4×4 Pixels with Corresponding Encoding

In the example, the total number of bits for residuals is 90 (9×2+4×8+2×12+16) because there are nine instances of mode 00 which uses 2 bits, etc. Storing full value residuals results in 256 bits (16×16).

In this example, we have a 2-bit value for each depth value. However, one may also choose to use a 2-bit value for each 2×2 depths (in order to reduce the number of 2-bit values used). In general each W×H depth can use Q bits to indicate the mode.

For static assignment, we can supply several modes per tile to choose from. For example, one mode can be that the residual bits are spread out over the depths in a totally uniform way. Another mode may use fewer bits closer to the anchor points and more bits the farther away from the anchor point the depth is located in the tile.

While an embodiment using an anchor encoding-based compression technique has been described, dynamic residual bit allocation can also be used for any compressor that encodes residuals. The dynamic delta value bit allocation is also possible to use with other predictors. For example, if we use a bilinear patch (which is created from four depth values plus their x,y-positions) as a predictor, we can encode that patch as one anchor point, and two delta-vectors, and then a residual value for the fourth point, which is the difference between the plane equation from the first three points and the fourth point. The number of bits spent on these two delta vectors, and the residual bits for the fourth point can be dynamically assigned in a similar way as described above for anchor encoding. The same can easily apply to other predictor functions as well.

Referring to FIG. 1, an apparatus 10 may include a rasterizer and a series of pixel pipelines 14a-14n. A depth test unit 16a-16n may be provided for each pixel pipeline. The depth caches and culling unit 18 may be used for depth value culling. Compression may be done at a compressor 20 and decompression may be done at a decompressor 24. A delta mode table 22 (like Table 1) may be provided as well. Finally, random access memory 26 may be provided for the compression and decompression engines.

Figure 2:
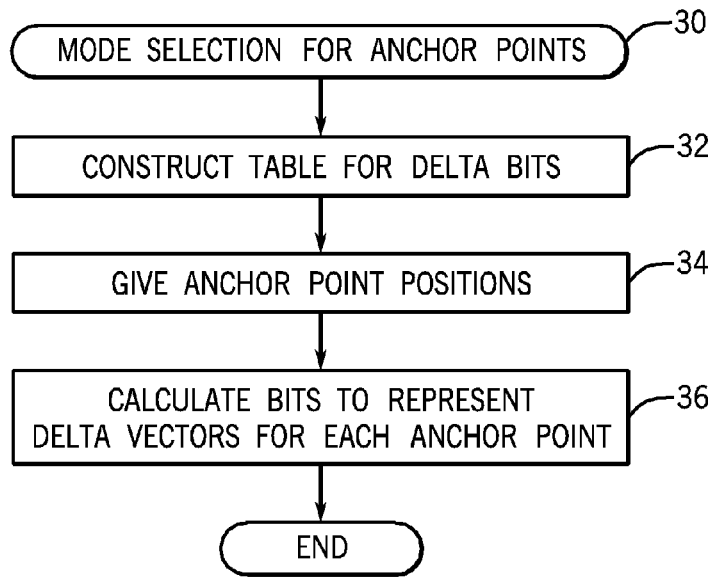
FIG. 2 is a flow chart for mode selection for anchor points in accordance with one embodiment.

Referring to FIG. 2, a mode selection sequence 30 for an anchor point may be implemented in hardware, software, and/or firmware. In software and firmware embodiments, it may be implemented by computer executed instructions stored in a non-transitory computer readable medium, such as a magnetic, optical, or semiconductor memory.

The mode selection for the anchor points begins by constructing a table for the delta bits, as indicated in block 32. Then the anchor point positions are given in block 34. Finally, the bits to represent each delta vector for each anchor point are calculated in block 36.

A sequence 38 for dynamic residual value bit allocation may be implemented in software, firmware, and/or hardware. In software and firmware embodiments, it may be implemented by computer executed instructions stored in a non-transitory computer readable medium, such as an optical, magnetic, or semiconductor memory.

The sequence beings by comparing a predicted depth to the actual depth, as indicated in block 40. Then the residual value is calculated, as shown in block 42.

The shortest mode to encode the residual value bits is then selected (block 44). The mode value is filled in in the residual mode mask (block 46). Finally, the residual mode mask is stored in the encoded tile data, as indicated in block 48.

Figure 4:
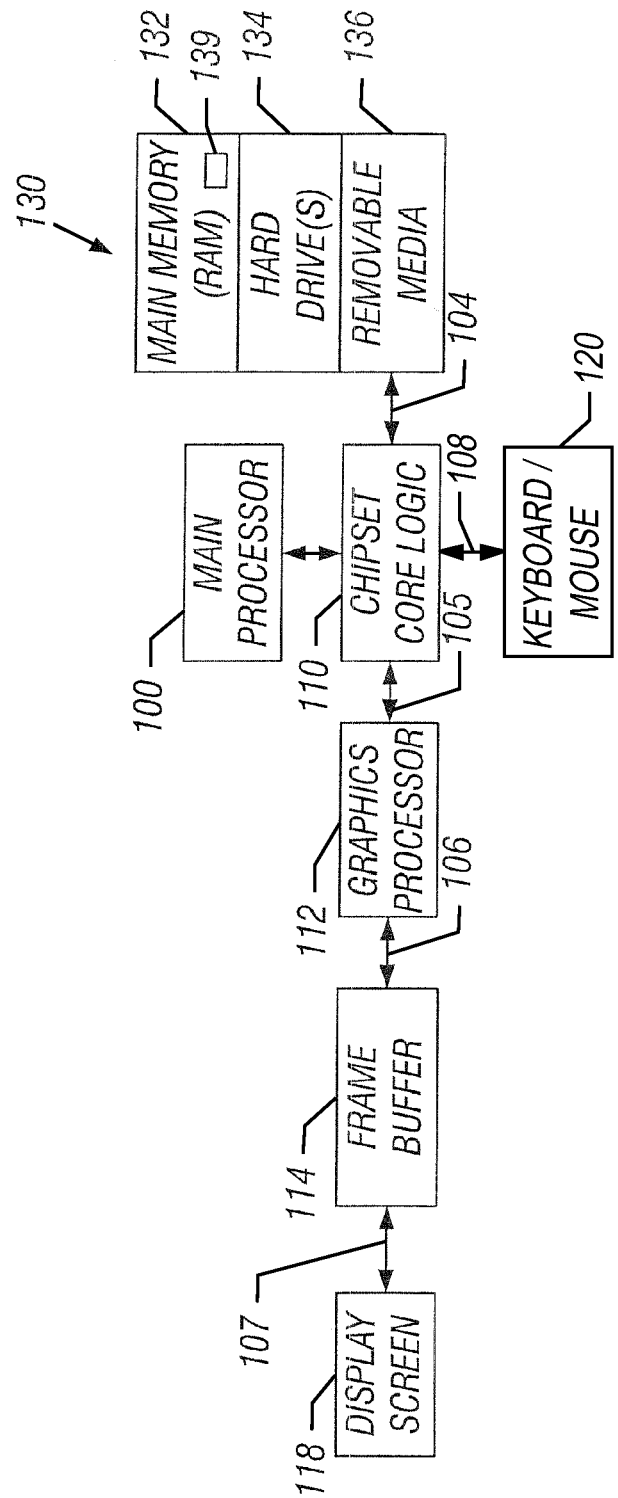
FIG. 4 is a system depiction for one embodiment.

The computer system 130, shown in FIG. 4, may include a hard drive 134 and a removable medium 136, coupled by a bus 104 to a chipset core logic 110. The computer system may be any computer system, including a smart mobile device, such as a smart phone, tablet, or a mobile Internet device. A keyboard and mouse 120, or other conventional components, may be coupled to the chipset core logic via bus 108. The core logic may couple to the graphics processor 112, via a bus 105, and the central processor 100 in one embodiment. The graphics processor 112 may also be coupled by a bus 106 to a frame buffer 114. The frame buffer 114 may be coupled by a bus 107 to a display screen 118. In one embodiment, a graphics processor 112 may be a multi-threaded, multi-core parallel processor using single instruction multiple data (SIMD) architecture.

In the case of a software implementation, the pertinent code may be stored in any suitable semiconductor, magnetic, or optical memory, including the main memory 132 (as indicated at 139) or any available memory within the graphics processor. Thus, in one embodiment, the code to perform the sequences of FIGS. 2 and 3 may be stored in a non-transitory machine or computer readable medium 130, such as the memory 132, and/or the graphics processor 112, and/or the central processor 100 and may be executed by the processor 100 and/or the graphics processor 112 in one embodiment.

Figure 3:
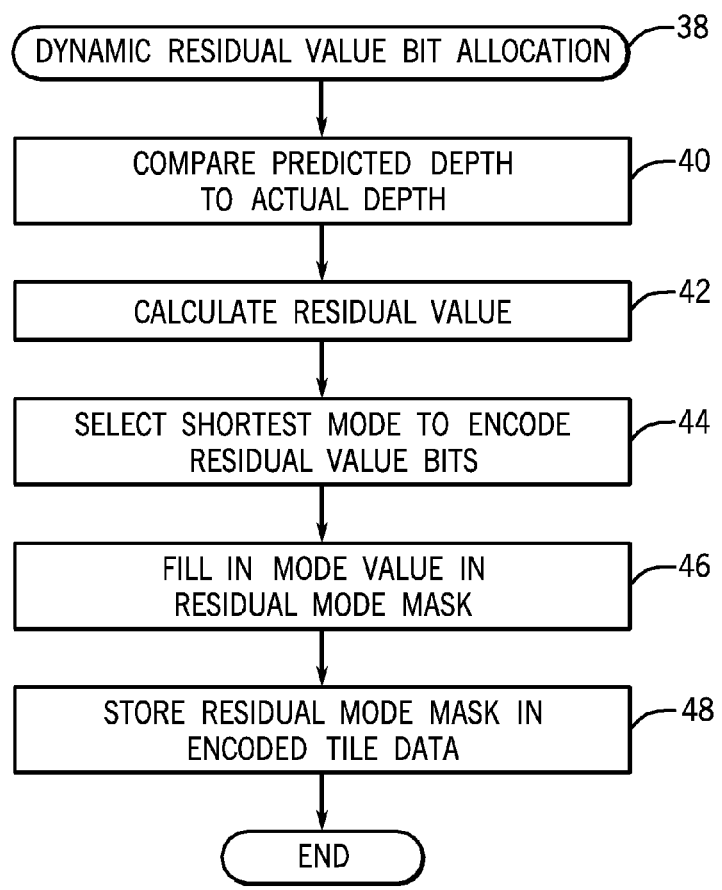
FIG. 3 is a flow chart for dynamic residual value bit allocation in accordance with one embodiment.

FIGS. 2 and 3 are flow charts. In some embodiments, the sequences depicted in these flow charts may be implemented in hardware, software, or firmware. In a software embodiment, a non-transitory computer readable medium, such as a semiconductor memory, a magnetic memory, or an optical memory may be used to store instructions and may be executed by a processor to implement the sequences shown in FIGS. 2 and 3.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present invention. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. A method comprising:
   determining a characteristic of depth data;
   using a graphics processor to compress the depth data by varying the number of bits used to encode residual values depending on the characteristic of the depth data;
   varying a number of bits used to enable delta values; and
   selecting a number of bits for X vectors and Y vectors and assigning a number of residual bits per depth.

2. The method of claim 1 including using anchor point encoding.

3. The method of claim 1 including enabling the selection of each of said bit numbers for X vectors, Y vectors, and residual bits per depth.

4. The method of claim 1 including providing a plurality of selectable modes, each mode specifying a particular number of bits for X vectors, Y vectors, and residual bits per depth.

5. The method of claim 4 including calculating, for an anchor point, a minimum number of bits needed to represent the delta vectors.

6. The method of claim 5 including selecting a mode with a maximum number of residual bits that provides the needed number of bits for the delta vectors.

7. The method of claim 6 including storing an indicator of how many residual bits are needed for a given anchor point.

8. The method of claim 1 including reducing the number of bits for X or Y values only if the number of bits for the residual value can be increased correspondingly.

9. A non-transitory computer readable medium storing instructions executed by a processor to:
   determine a characteristic of depth data;
   compress depth data by varying a number of bits used to encode residual values depending on the characteristic of the depth data;
   vary a number of bits used to enable delta values; and
   select a number of bits for X vectors and Y vectors and assigning a number of residual bits per depth.

10. The medium of claim 9 further storing instructions to use anchor point encoding.

11. The medium of claim 9 further storing instructions to enable the selection of each of said bit numbers for X vectors, Y vectors, and residual bits per depth.

12. The medium of claim 9 further storing instructions to provide a plurality of selectable modes, each mode specifying a particular number of bits for X vectors, Y vectors, and residual bits per depth.

13. The medium of claim 12 further storing instructions to calculate, for an anchor point, a minimum number of bits needed to represent the delta vectors.

14. The medium of claim 13 further storing instructions to select a mode with a maximum number of residual bits that provides the needed number of bits for the delta vectors.

15. The medium of claim 14 further storing instructions to store an indicator of how many residual bits are needed for a given anchor point.

16. The medium of claim 9 further storing instructions to reduce the number of bits for X or Y values only if the number of bits for the residual value can be increased correspondingly.

17. An apparatus comprising:
    a processor to determine a characteristic of depth data, compress depth data by varying a number of bits used to encode residual values depending on the characteristic of the depth data, vary a number of bits used to enable delta values, select a number of bits for X vectors and Y vectors and assign a number of residual bits per depth; and
    a storage coupled to said processor.

18. The apparatus of claim 17, said processor to use anchor point encoding.

19. The apparatus of claim 17, said processor to enable the selection of each of said bit numbers for X vectors, Y vectors, and residual bits per depth.

20. The apparatus of claim 17, said processor to provide a plurality of selectable modes, each mode specifying a particular number of bits for X vectors, Y vectors, and residual bits per depth.

21. The apparatus of claim 20, said processor to calculate, for an anchor point, a minimum number of bits needed to represent the delta vectors.

22. The apparatus of claim 21, said processor to select a mode with a maximum number of residual bits that provides the needed number of bits for the delta vectors.

23. The apparatus of claim 22, said processor to store an indicator of how many residual bits are needed for a given anchor point.

24. The apparatus of claim 17, said processor to reduce the number of bits for X or Y values only if the number of bits for the residual value can be increased correspondingly.

* * * * *